US005730356A

United States Patent [19]
Mongan

[11] Patent Number: 5,730,356
[45] Date of Patent: Mar. 24, 1998

[54] METHOD AND SYSTEM FOR IMPROVING THE EFFICIENCY OF A BOILER POWER GENERATION SYSTEM

[76] Inventor: Stephen Francis Mongan, Powercut, Fishergate, York, Y01 4UA, England

[21] Appl. No.: 510,054

[22] Filed: Aug. 1, 1995

[51] Int. Cl.⁶ ......................................... F24D 3/08
[52] U.S. Cl. ...................... 237/19; 237/12.3 C; 237/2 A
[58] Field of Search ................... 237/19, 12.3 C, 237/2 A

[56] References Cited

U.S. PATENT DOCUMENTS

| | | | |
|---|---|---|---|
| 3,680,189 | 8/1972 | Noren | 29/157.3 |
| 4,020,898 | 5/1977 | Grover | 165/105 |
| 4,108,239 | 8/1978 | Fries | 165/105 |
| 4,136,731 | 1/1979 | DeBoer | 165/12 |
| 4,275,510 | 6/1981 | George | 34/90 |
| 4,340,207 | 7/1982 | Bruhn et al. | 266/155 |
| 4,512,387 | 4/1985 | Rodriguez et al. | 165/1 |
| 4,605,498 | 8/1986 | Kulish | 210/222 |
| 4,621,681 | 11/1986 | Grover | 165/47 |
| 4,699,315 | 10/1987 | White | 237/8 |
| 4,880,503 | 11/1989 | Molitorisz | 165/47 |

Primary Examiner—Henry A. Bennett
Assistant Examiner—Derek S. Boles
Attorney, Agent, or Firm—Thomason & Moser

[57] ABSTRACT

A system and method for recovering heat from waste fluids and gases and for improving the combustion of hydrocarbon fuels and the heat transfer within a boiler. The system comprises a controller, a distribution manifold, a plurality of heat recovery modules and a plurality of magnetic ionization modules. The system possesses the ability to monitor heated water demands within a building and to response by matching the demands with the most cost effective heated water supply source. The plurality of the heat recovery modules includes a flue heat recovery module, a waste water heat recovery module and a cooker heat recovery module for the recovery of heat from waste gases or liquids. The plurality of magnetic ionization modules includes a fuel magnetic ionization module and a water magnetic ionization module for charging fuel molecules to effect a more complete and efficient combustion and for charging the mineral molecules in water to prevent crystallization respectively.

27 Claims, 13 Drawing Sheets

METHOD AND SYSTEM FOR IMPROVING THE EFFICIENCY OF A BOILER POWER GENERATION SYSTEM

FIELD OF THE INVENTION

The present invention relates to a method and system for improving the heat transfer and control of a boiler power generation system. More particularly, this invention relates to a system and method that incorporates a controller, a distribution manifold, and a plurality of heat recovery modules and magnetic ionization modules for recovering heat from waste fluids and gases and for improving the combustion of hydrocarbon fuels.

BACKGROUND OF THE INVENTION

Currently, it is estimated that space heating, water heating and industrial process heating account for 40% of all energy consumption in the industrialized nations. Furthermore, over 70% of this energy is currently provided by a limited supply of hydrocarbon fuels. In order to conserve and maximize the benefits of our limited resources, it is necessary to increase the thermal efficiency of these processes.

Traditionally, many of the processes and techniques for accomplishing these three functions generate an enormous amount of waste fluids and gases. These byproducts are often simply discharged into the environment without treatment. Generally, these waste products retain a large quantity of energy in the form of heat which, upon release, contributes to the problem of global warming. The waste heat is also indicative of the thermal inefficiency of these processes and the lack of a heat recovery mechanism.

To illustrate, there are many commercial and residential demands for heated water. Such demands include providing heated water to lavatories, laundry facilities and central heating systems. After the heated water is used for washing and bathing, the waste water is simply discharged into the drain. The waste water often retains a significant amount of recyclable heat which is simply released into the environment. The discharge of heated waste water represents the thermal inefficiency of these processes.

In addition, it is generally recognized that heating systems are inefficient in their operation. Residential homes and commercial facilities generally employ a variety of furnaces or boilers. A significant percentage of the heat of these furnaces or boilers is lost through the escape of hot gases up the flue.

Furthermore, furnaces and boilers are typically powered by the well known process of combustion of hydrocarbon fuels. However, the efficiency of the combustion process is affected by a variety of different factors.

First, the combustion of hydrocarbon fuels such as natural gas involves the process of oxidation, accompanied by the production of heat and light. Although oxygen itself does not burn, it reacts chemically with the fuel to liberate the chemical energy stored in the molecular bonds. The efficiency of the combustion process is generally gauged by the production of the byproducts carbon dioxide $CO^2$ and carbon monoxide CO. When an adequate and uniform supply of oxygen is present, $CO^2$ is formed to the exclusion of CO. It is generally recognized that when one pound of carbon is burned into CO instead of $CO^2$, a quantity of heat approximately 10,000 Btu (British thermal unit) is lost. One Btu equates to the quantity of heat required to raise the temperature of one pound of water from 60° F. to 61° F. at a constant pressure of one atmosphere. Thus, a lack of uniform oxygen supply affects oxidation, thereby reducing the efficiency of the combustion process.

Second, the presence of an adequate oxygen supply alone may not necessarily increase the efficiency of the combustion process. Specifically, the orientation of the fuel molecules also contributes to the affinity between the carbon and oxygen atoms, thereby affecting the formation of $CO^2$. In the combustion of the hydrocarbon fuels, the outer layer of hydrogen atoms are the first to be combusted. The spin of the protons of these outer hydrogen atoms possesses two distinct forms, ortho-hydrogen and para-hydrogen. Since para-hydrogen is less volatile and more stable, this form of hydrogen is prevalent in hydrocarbon fuels. However, the combustion of para-hydrogen is less complete and may result in the creation of CO instead of $CO^2$, thereby reducing the efficiency of the combustion process.

Furthermore, a typical problem of any water system is the accumulation of scale on the inner surfaces of metal pipes, tanks, and boiler. The scale is a deposit of carbonate salts formed by water containing dissolved calcium and magnesium salts, or ferrous iron, which serve as electrolytes. Furthermore, the dissimilar metals in our water system such as copper, steel, brass and aluminum act as electrodes when they are in contact with water. When an electrolyte is dissolved in water, the solution conducts electricity in the presence of two electrodes having different oxidation potentials.

First, the charge is transferred through the bulk of the solution by the migration of positive and negative ions to the electrode of opposite charge. Second, a reaction occurs at the negative electrode, which allows electrons to flow into the negative electrode from an outside source, where the electrons are combined with the positive ions in the solution. Third, a reaction occurs at the positive electrode, producing electrons that flow toward the negative electrode through an external circuit. This three step process causes corrosion of metal surfaces and deposits a layer of scales within a water system. Since scale acts as an insulator, the accumulation of scale along the inner plate of a boiler reduces the efficiency of the heat exchange process within the boiler.

Over the years, various heat recovery systems have been developed to address these problems. Examples of such systems are described in U.S. Pat. No. 4,699,315 issued on Oct. 13, 1987 to White, U.S. Pat. No. 4,621,681 issued on Nov. 11, 1986 to Grover and U.S. Pat. No. 4,136,731 issued on Jan. 30, 1979 issued to Deboer.

White discloses a system for recovering heat from a chimney by incorporating a heat recovery unit on top of the chimney. The system recovers the heat by heating water which is returned to a heat exchanger for heating a conditioned space within a building. However, this simple system lacks the important ability to detect and monitor energy loading from different parts of the building and also lacks the ability to channel the recovered heat to meet different energy needs within the building.

Grover discloses a system for recovering heat from waste gases of a boiler by using a plurality of heat pipes in combination with a steam boiler. The recovered heat is converted into heated water or heated steam. Again, this system lacks the important ability to detect, monitor and satisfy the energy loading from different parts of the building.

DeBoer discloses a heat transfer system for recovering heat from the flue of the furnace. The system incorporates a heat exchanger disposed within the flue of the furnace where recovered heat in the form of heated water is supplied to the water heater and a fan chamber for supplementing the furnace heating operation. The system incorporates a seasonal switch, timer, and thermostats for controlling the movement of the recovered heated water. However, the system still lacks the ability to detect, monitor and satisfy the energy loading of the building, such as matching the most cost effective power generation source with a particular demand at a particular time. In fact, the heat recovery system of DeBoer only operates seasonally.

Therefore, a need exists in the art for a system and method that incorporates heat recovery and magnetic ionization techniques in combination with load matching controls, for improving the thermal efficiency of a boiler power generation system by reducing the amount of waste heat discharged into the environment.

SUMMARY OF THE INVENTION

The system of the present invention comprises a controller, a distribution manifold, a plurality of heat recovery modules and a plurality of magnetic ionization modules. The system recovers heat from waste fluids and gases, improves the combustion of hydrocarbon fuels and improves the heat transmission through the boiler plate of a boiler. The system possesses the ability to monitor "loading" within a building and to response by matching the demand with the most cost effective power generation source. Loading is defined as the sum total of the various demands for heated water within a building. The system of the present invention is adapted to a building generally having a boiler, a cooking range, a hot water tank, a central heating/cooling system and a plurality of heated water requirements such as laundry machines and lavatories.

The controller incorporates a processor, a display, an energy meter, and a plurality of sensors. The plurality of sensors are disposed along the multitude of heated water circuits (supply circuits and demand circuits) for measuring the different demands for heated water and the current available sources of heated water. The sensors are electrically coupled to the processor which is programmed to record the measurements and to deduce the most efficient manner of meeting the loading of the building. If the processor detects or anticipates a disparity in the loading, the controller will activate an appropriate heated water source to meet the demand such as firing-up the boiler or releasing recovered heated water from a storage tank.

The energy meter provides an instantaneous reading of energy consumption within the building which is displayed on the display of the controller. By incorporating a communication device such as a modem, the controller permits off-site monitoring of energy consumption for maintenance and billing purposes.

The distribution manifold of the present invention serves as a central exchange point for receiving heated water from a plurality of supply circuits and for distributing heated water to a plurality of demand circuits. The distribution manifold of the present invention incorporates a twin manifold configuration having two chambers connected by a flow pipe and a return pipe. By disposing a flow sensor within the flow pipe or the return pipe, the controller is able to calculate the loading of the building and to differentiate heat generated by the boiler versus heat recovered from a heat recovery module.

The plurality of the heat recovery modules includes a flue heat recovery module, a waste water heat recovery module and a cooker heat recovery module. Each heat recovery module incorporates evacuated sealed copper heat pipes for the recovery of heat from waste gases or liquids. The heat pipe carries an evaporable working fluid and a wick for promoting capillary pressure differences. In use, one end of the pipe is brought into contact with a heat source from which heat is recovered and, contemporaneously, the opposite end of the pipe is cooled. In this manner, heat is recovered from waste gases and liquids through the repeated process of evaporating and condensing the working fluid.

The flue heat recovery module is coupled to the flue of a boiler or furnace. The flue heat recovery module comprises a plurality of heat pipes, a water manifold, a flue gas manifold and a water storage section. The flue gas manifold is separated from the water manifold by a plate to form a water-tight seal. The heat pipes extend through the plate with one end disposed within the flue gas manifold and the other end disposed within the water manifold. In use, hot flue gases are passed around one end of the heat pipe in the flue gas manifold from which heat is extracted and transferred to the water manifold. Thus, the heat in the waste gases is recovered and stored as heated water in the water storage section.

The waste water heat recovery module is coupled to the sewage pipe of a building where waste water is discharged to a sewage system. The waste water heat recovery module comprises a plurality of heat pipes, a water manifold and a substantially cone shaped waste water manifold. The water manifold is separated from the waste water manifold by a plate to form a water-tight seal. The heat pipes extend through the plate with one end disposed within the water manifold and the other end disposed within the waste water manifold. In use, hot waste water are passed around one end of the heat pipe in the waste water manifold from which heat is extracted and transferred to the water manifold.

In a second embodiment of the waste water heat recovery module, a plurality of fluid storage sections are provided as temporary storage for holding the waste water and the recovered heated water. Since it may not be possible to extract all the recoverable heat from the waste water in one pass, the additional fluid storage sections permit the waste water to be rechanneled into the waste water recovery module repeatedly. Once a substantial amount of the reusable heat is recaptured, the waste water is finally discharged into the sewage system.

The cooker heat recovery module is disposed over the burners of a traditional cooking range. The cooker heat recovery module comprises a plurality of heat pipes, a center water manifold, a top plate having a plurality of apertures and a bottom plate having a plurality of apertures. The two plates are coupled to the center water manifold to define a substantially enclosed burner space which circumscribes the burners of the cooking range. The heat pipes extend through the center water manifold with one end disposed within the water manifold and the other end disposed within the burner space defined by the top and bottom plates. In use, hot gases are passed around one end of the heat pipe in the burner space from which heat is extracted and transferred to the water manifold.

The plurality of magnetic ionization modules includes a fuel magnetic ionization module and a water magnetic ionization module. Each magnetic ionization module incorporates ceramic magnets for charging the molecules in hydrocarbon fuel or minerals in water. In use, the magnetic ionization modules circumscribe a plurality of fuel inlet pipes and/or water inlet pipes from which a strong magnetic field is applied to the material flowing within these pipes. The magnetic field serves to charge the fuel molecules to effect a more complete and efficient combustion and to charge the mineral molecules in water to prevent crystallization.

In another embodiment of the present invention, the recovered heated water is used to propel a process within a "packaged absorption chiller" for providing cooled water to a central air conditioning system. The heated water is used to release a refrigerant from a lithium bromide solution where the condensed refrigerant is used to chill water for a central air conditioning system.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
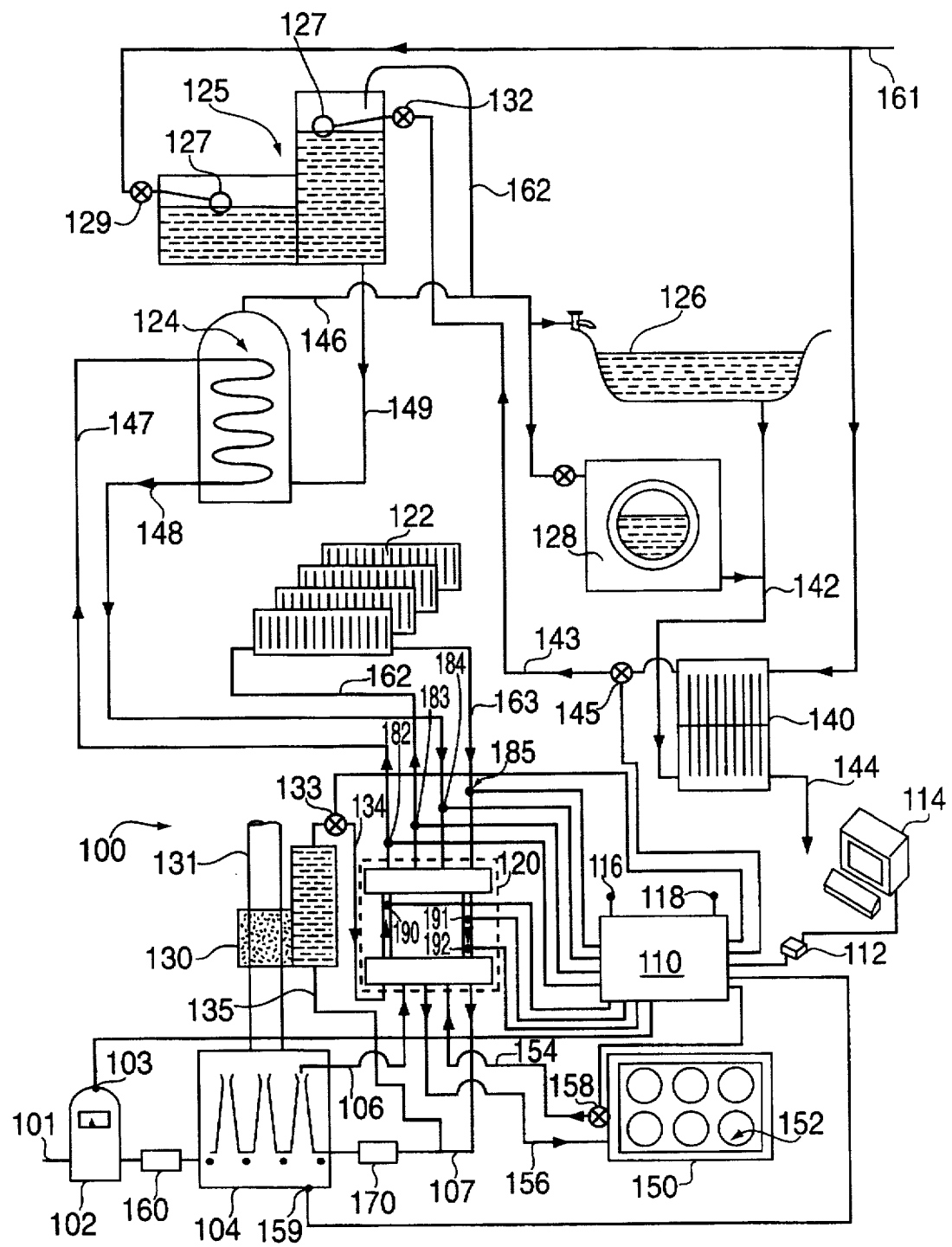
FIG. 1 illustrates the thermal efficiency system of the present invention adapted for recovering heat from waste fluids and gases from a building having a plurality of heat generating components.

FIG. 1 depicts the system of the present invention adapted for recovering heat from waste fluids and gases from a conventional residential or commercial building. Such building generally contains a boiler or furnace 104, a cooking range 152, a central space heating/cooling system 122, a hot water tank 124 and a plurality of hot water needs such as for bathing 126 and for laundering 128. These heat generating components and heat requirements produce a large quantity of waste gases and fluids. These waste byproducts retain a large quantity of recoverable heat which is simply discharged into the environment. In order to recycle this valuable source of energy, the present invention incorporates a plurality of heat recovery modules (heat exchangers) throughout the building. Specifically, the system recaptures heat from the effluent fluids of the building and hot gases from the boiler flue 131 and cooking range 152.

The system 100 comprises a controller 110, a distribution manifold 120, a plurality of heat recovery modules 130, 140 and 150 and a plurality of magnetic ionization modules 160 and 170. FIG. 1 depicts the integration of the system 100 of the present invention with the heat generating components and heat requirements of a conventional building.

A gas inlet pipe 101 provides natural gas to fuel the boiler 104. A gas meter 102 and a fuel magnetic ionization module 160 are disposed along gas inlet pipe 101 for monitoring the consumption of fuel and for altering the charge of the fuel molecules respectively. In turn, the boiler 104 provides hot water to a distribution manifold 120 via flow pipe 106 and return pipe 107. Hot waste gases from the combustion process within the boiler 104 are expelled through flue 131. Furthermore, a second water magnetic ionization module 170 is disposed along return pipe 107 for preventing the crystallization of minerals on the boiler plate within the boiler.

The distribution manifold 120 serving as a central heat exchange point, receives heated water from a number of different sources aside from the boiler. Flue heat recovery module 130 recovers heat from the hot gases in the flue 131 and channels heated water to the distribution manifold 120 via control sensor 133, flow pipe 134 and return pipe 135. Similarly, the cooker heat recovery module 150 recovers heat from the hot gases in a cooking range 152 and channels heated water to the distribution manifold 120 via flow pipe 154 and return pipe 156. In turn, the distribution manifold 120 channels the heated water to a hot water tank 124 and a central heating/cooling system 122 via two sets of flow/return pipes 147/148 and 162/163 respectively, for heating water and providing space heating.

The hot water tank 124 provides hot water via flow pipe 146 to a multitude of hot water needs such as a tub 126 and a laundry machine 128. The hot water tank 124 receives its water through a flow pipe 149 from a supplemental tank 125 which, in turn, receives its water from a cold water main 161. A release valve 129 and a control device 127 (such as a float) are provided to shut off the cold water supply when the supplemental tank 125 is filled to a predefined level. The supplemental tank 125 is a substantially L-shaped container with two additional inlet points. One inlet point receives heated water from the waste water heat recovery module 140 via a flow pipe 143. Another set of release valve 132 and control device 127 is provided to control the flow of recovered heated water to the supplemental tank 125. When recovered heated water is available, the L-shaped configuration permits the supplemental tank 125 to receive recovered heated water to the exclusion of the cold water from the main 161. Finally, a second inlet point receives water directly from the hot water tank 124 via flow pipe 162. The supplemental tank 125 serves the important function of storing recovered heat by raising the temperature of the water feeding the hot water tank 124, thereby reducing the energy needed to heat water. In fact, supplemental tank 125 may serve as an extended hot water tank.

To illustrate, if the system anticipates an upcoming excessive demand for hot water, it will increase the hot water capacity by heating the water in the supplemental tank by circulating the water between the two tanks via flow pipes 149 and 162. Thus, the capacity of the hot water tank is increased by the size of the supplemental tank 125. In addition, if the system recovers an excess amount of heat without sufficient demand for hot water, hot water is again released into the supplemental tank 125 to take advantage of its heat storage capacity.

Effluent fluids from the building such as from the tub 126 and laundry machine 128 are discharged into the waste water heat recovery module 140 via flow pipe 142. The waste water heat recovery module 140 recovers heat from the effluent fluids and transfers the recovered heat to the cold water received from the water main 161. When a substantial amount of heat is recovered, the effluent fluids are discharged through flow pipe 144, while heated water is channeled to the supplemental tank 125.

Finally, a controller 110 monitors the "loading" within the building and responds by matching the demand with the most cost effective heat generating source. Loading is defined as the sum total of the various demands for heated water within a building. The controller 110 calculates loading by gathering information from a plurality of temperature sensors 182, 183, 184, 185, 190 and 191, a plurality of thermostats 116 (space heating/cooling) and 118 (water tank), flow sensor 192, and a plurality of sensor controls 133, 145, 158 and 159. The controller 110 is programmed to calculate the instantaneous energy need of the building. The controller 110 takes into account the temperature of all water circuits (supply circuits and demand circuits), the flow of water within the distribution manifold 120, the settings of the thermostats, historical energy consumption patterns, programmed settings and ad hoc commands for determining and predicting the most cost effective method of meeting the energy demands of the building. When recovered heat is available from one of a plurality of heat recovery modules, the controller 110 will channel the recovered heat to meet a particular energy need. This load matching feature enhances the thermal efficiency of the present invention. Furthermore, although FIG. 1 depicts four (4) supply circuits and two (2) demand circuits, those skilled in the art will realize that a multitude of supply and demand circuits can be employed within a building.

Optionally, a modem 112 and an energy meter 103 are coupled to the controller for providing off-site monitoring capabilities. A remote station 114 in communication with the controller 110 will be able to monitor the energy demands of the building and the performance of the various heat generating components within the building. This configuration permits off-sitedetection of failures and enhances billing functions.

Figure 2:
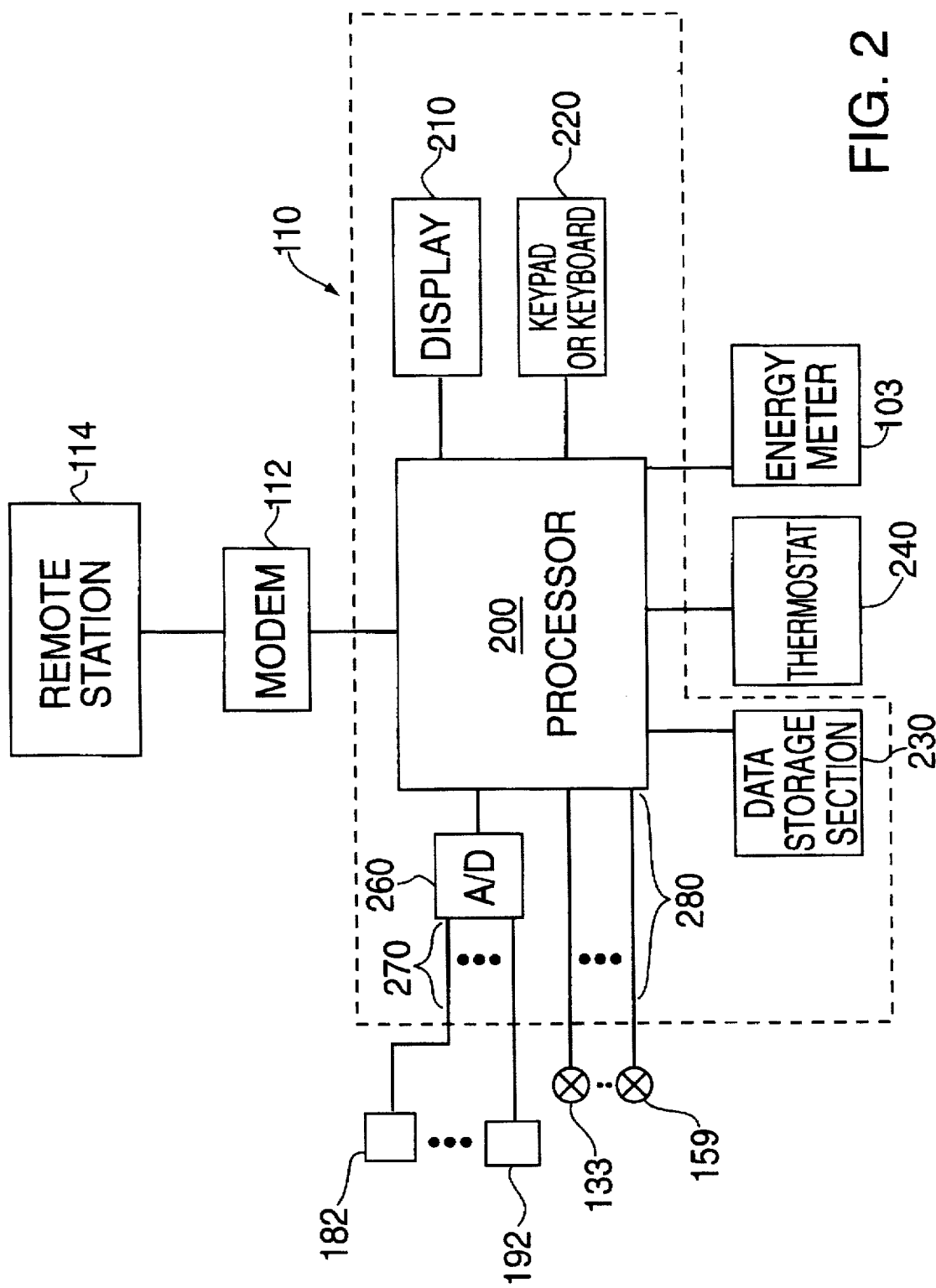
FIG. 2 illustrates a block diagram of the controller of the present invention.

FIG. 2 depicts a block diagram of the controller 110 of the present invention. The controller 110 comprises a processor 200, a display 210, a keypad 220, data storage section 230, an optional analog-to-digital converter 260. The controller is coupled to a plurality of sensors 182, 192, 133 and 159 (not all sensors are shown in FIG. 2).

The processor 200 is a general purpose programmable microprocessor commercially available from companies such as Intel Corporation. The processor 200 is programmed to receive information from a plurality of commercially available temperature sensors 182, 183, 184, 185, 190 and 191 and flow sensor 192. The temperature sensors disposed along the various water circuits, report the temperature of the water to the processor 200. This data in combination with the flow rate data reported by the flow rate sensor 192 from the distribution manifold 120, permits the processor 200 to calculate the current loading within the building.

The plurality of sensors are coupled to an optional analog-to-digital converter 260 via a plurality of signal connections 270. The analog-to-digital converter 260 converts analog data signals into a digital form, thereby permitting the processor 200 to communicate with analog sensors.

The data received from the sensors are stored in data storage section 230. Data storage section 230 may incorporate a number of devices such as a disk drive, semiconductor memory or other storage media. The cumulative gathering of data forms a historical energy consumption database from which the processor is able to learn the energy consumption pattern of the building. Thus, processor 200 is able to determine the instantaneous energy loading as well as anticipate upcoming energy needs.

A plurality of commercially available control sensors 133, 145, 158 and 159 are coupled to the processor 200 via a plurality of signal connections 280. The control sensors are coupled to the various heat recovery modules and the boiler for receiving control signals from the processor 200. In addition, the control sensors relate the temperature of the water within the various heat recovery modules to the processor 200. Thus, when the processor detects a demand for heated water, it calculates the demand and responds by activating the most appropriate heat generating source to match the demand. In the preferred embodiment of the present invention, the boiler 104 will not be activated until other heat generating sources are exhausted or deemed to be insufficient to meet the rate of demand.

Processor 200 also receives inputs from a plurality of thermostats 240. The thermostats are disposed throughout the building to selectively set a temperature for a conditioned space or hot water container. The settings on the thermostats are used by the processor 200 for calculating the loading of the building.

An optional energy meter 103 is electrically coupled to the processor 200 for reporting the energy consumption of the building. For example, such energy meter is coupled to the gas meter 102 or other meters (electric and oil) for monitoring the instantaneous consumption of energy within the building. Processor 200 incorporates this data for independent client billing and historical analysis of energy consumption pattern.

Furthermore, a display 210 and a keypad or keyboard 220 are electrically coupled to the processor 200 for displaying the status of the system and for entering specific instructions respectively. System information such as energy consumption rate, thermostat settings and status of the various heat recovery modules can be reported continuously to an operator via the display 210. The operator may query the system via the keypad 220 for additional information or send ad hoc instructions to the processor 200.

To illustrate, an operator may decide to override the load matching process of the processor 200 by requesting the activation of the boiler. In such situation, the operator may be willing to sacrifice efficiency in order to respond to an immediate energy need.

A modem 112 is coupled to the processor 200 for providing off-site monitoring and reporting capabilities to a remote station 114. Thus, a remote station may monitor a number of different off-site installations simultaneously. Since the controller 110 maintains a comprehensive up-to-date report on the energy consumption of a building, remote station 114 is able to detect failures and also perform billing functions.

Figure 3:
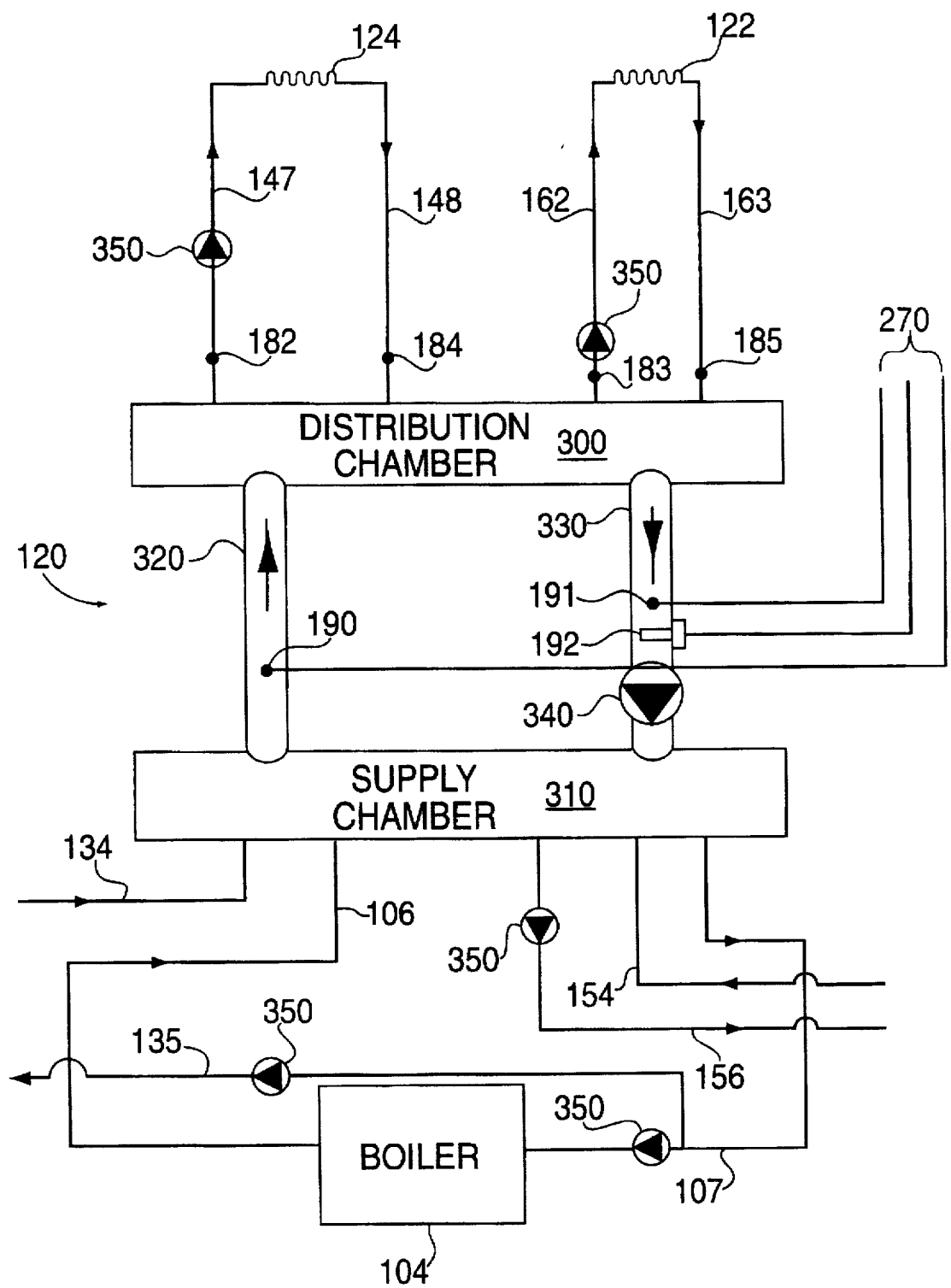
FIG. 3 illustrates the distribution manifold of the present invention.

FIG. 3 depicts the distribution manifold 120 of the present invention, which incorporates a twin manifold configuration. The distribution manifold 120 comprises a distribution chamber 300, a supply chamber 310, a flow section 320, a return section 330 and a water pump 340. The distribution manifold 120 is constructed from a corrosion resistant metal such as steel, where the chambers and sections are substantially shaped into cylindrical pipes. The two "mixing" chambers 300, 310 are welded to the two sections 320, 330 in a substantially perpendicular fashion to form a water-tight construction as illustrated in FIG. 3.

The distribution chamber 300 is in flow communication with a plurality of heated water demand circuits. These demand circuits carry heated water to hot water tank 124 and central heating/cooling system 122. In the preferred embodiment of the present invention, the demand circuits are coupled to the distribution chamber 300 through a plurality of screwed or flanged connections (not shown), for easy installation of additional new demand circuits to the distribution manifold.

The supply chamber 310 is in flow communication with a plurality of heated water supply circuits. These supply circuits carry heated water to the distribution manifold 120 from the boiler 104, the flue heat recovery module 130 and the cooker heat recovery module 150. Each of the demand and supply circuits is equipped with a control pump 350 for regulating the flow of fluids within the circuit.

A water pump 340 is also provided within the return section 330 for propelling the movement of fluids between the two chambers, thereby transferring the heat from the supply chamber 310 to the distribution chamber 300. By introducing a temperature sensor 190 within flow section 320, the controller 110 is able to detect the temperature of the water delivered to the distribution chamber 300. Similarly, a temperature sensor 191 and a flow sensor 192 are disposed within return section 330 to measure the temperature and flow rate of the water returning from the distribution chamber 300. However, those skilled in the art will realize that the flow sensor 192 can be deployed in other locations within the distribution manifold for measuring the flow rate. By calculating the temperature difference of the water between the flow section 320 and return section 330 in combination with the flow rate data, the controller 110 is able to deduce the loading of the building.

Furthermore, the twin manifold design enables the controller 110 to gauge the amount of heat provided by the boiler 104 and each of the heat recovery module. By activating each heat generating source sequentially as needed, the controller is able to determine the capacity of a heat generating source to meet a particular demand.

To illustrate, if the controller detects a demand for heated water, it will activate one of the heat recovery module (if available) to satisfy the demand. The controller 110 measures the effectiveness of the response by monitoring the temperature and flow rate data within the distribution module 120. If the response is inadequate to satisfy the demand for heated water, the controller will sequentially activate additional heat recovery modules or the boiler until the demand is adequately satisfied. The controller's response also accounts for ad hoc instructions or predefined criteria such as a predefined response time limit. Thus, the boiler may be activated prior to the depletion of heated water within the heat recovery modules. The controller's ability to evaluate and solve energy demand problems within a building is an important aspect of the present invention.

Figure 4:
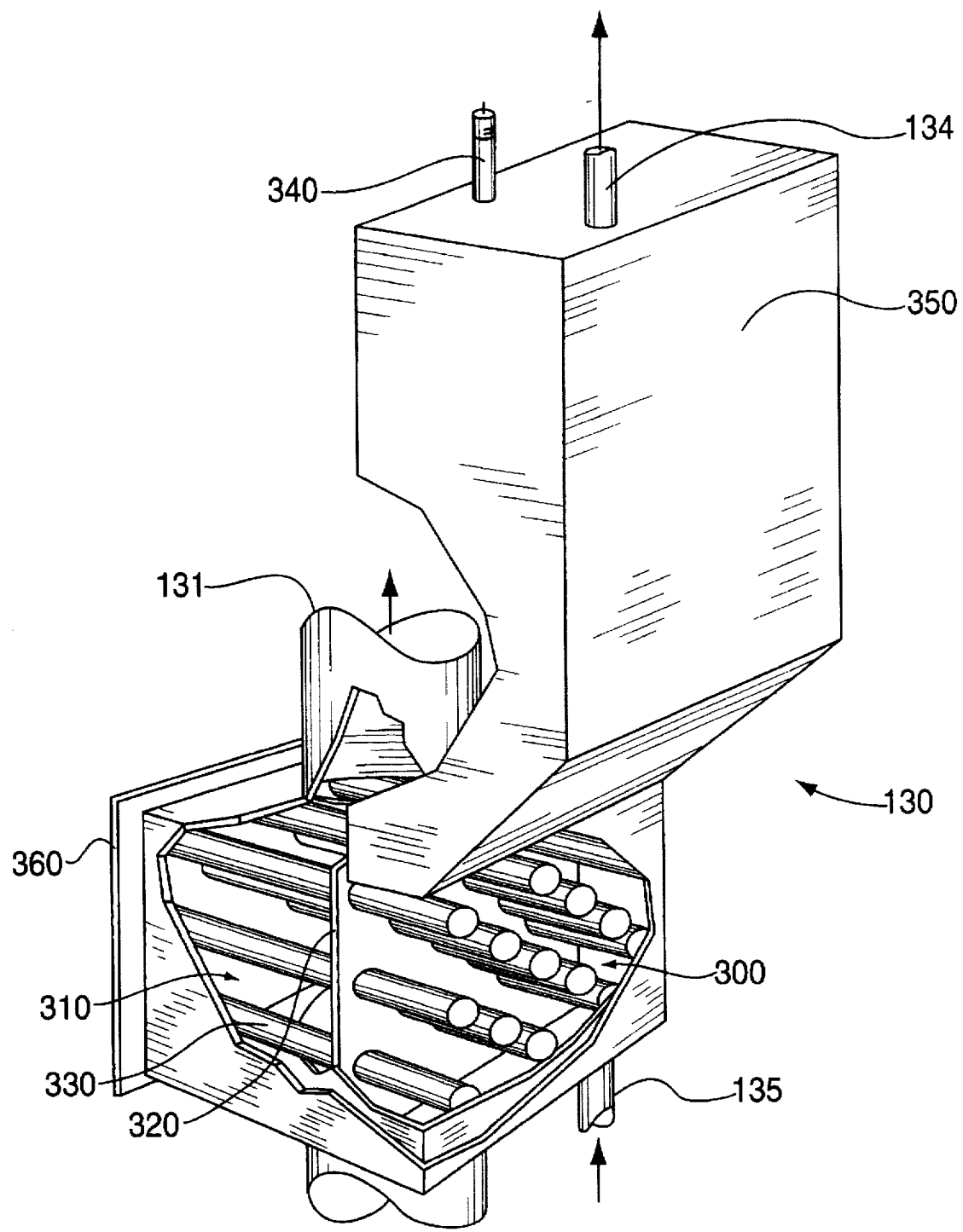
FIG. 4 illustrates a perspective view of the flue heat recovery module of the present invention.

FIG. 4 illustrates a perspective view of the flue heat recovery module 130 of the present invention. The flue heat recovery module 130 is coupled to the flue 131 of a boiler or furnace for recovering heat from the hot flue gases. The hot gases are the byproducts from the combustion process such as the burning of hydrocarbon fuels. The flue heat recovery module 130 comprises a plurality of heat pipes 330, a water manifold 300, a flue gas manifold 310, a safety valve 340 and a water storage section 350.

The flue gas manifold 310 and the water manifold 300 are generally constructed from a corrosion resistant metal such as steel. The flue gas manifold 310 is interposed between two sections of the flue 131 as illustrated in FIG. 4. As hot gas rises up the flue 131, it expands into the flue gas manifold 310 where a plurality of heat pipes is disposed for the recapture of the waste heat. The volume of the flue gas manifold is suitably selected such that the free area around the heat pipes substantially equals to the free area of an equivalent section of the flue. Namely, the pressure loss as the hot gas enters the flue gas manifold 310 is minimized. Furthermore, an optional detachable inspection plate 360 is incorporated on one side of the flue gas manifold 310 for allowing access during maintenance functions.

The flue gas manifold 310 is separated from the water manifold 300 by a metal plate 320 to form a liquid-tight seal. The heat pipes extend through the metal plate 320 with one end disposed within the flue gas manifold 310 and the other end disposed within the water manifold 300. The water manifold 300 contains a working fluid such as water where the heat from the hot gas is captured and stored. In use, hot flue gases are passed around one end of the heat pipe in the flue gas manifold 310 from which heat is extracted and transferred to the water manifold 300.

A water storage section 350 extends vertically above the water manifold 300 for storing heated water generated from the recovery of heat from the hot gases. As heated water rises toward the water storage section 350, a control sensor 133 (as shown in FIG. 1) is coupled to the flow pipe 134 to control the release of heated water to the distribution manifold 120. A return pipe 135 replenishes the water extracted from water manifold 300 with return water from the distribution manifold. Furthermore, a safety release valve 340 is coupled to the water storage section 350 for preventing the accumulation of excessive pressure within the flue heat recovery module 130. Thus, the heat in the waste gases is recovered and stored safely as heated water in the water storage section 350.

Figure 5:
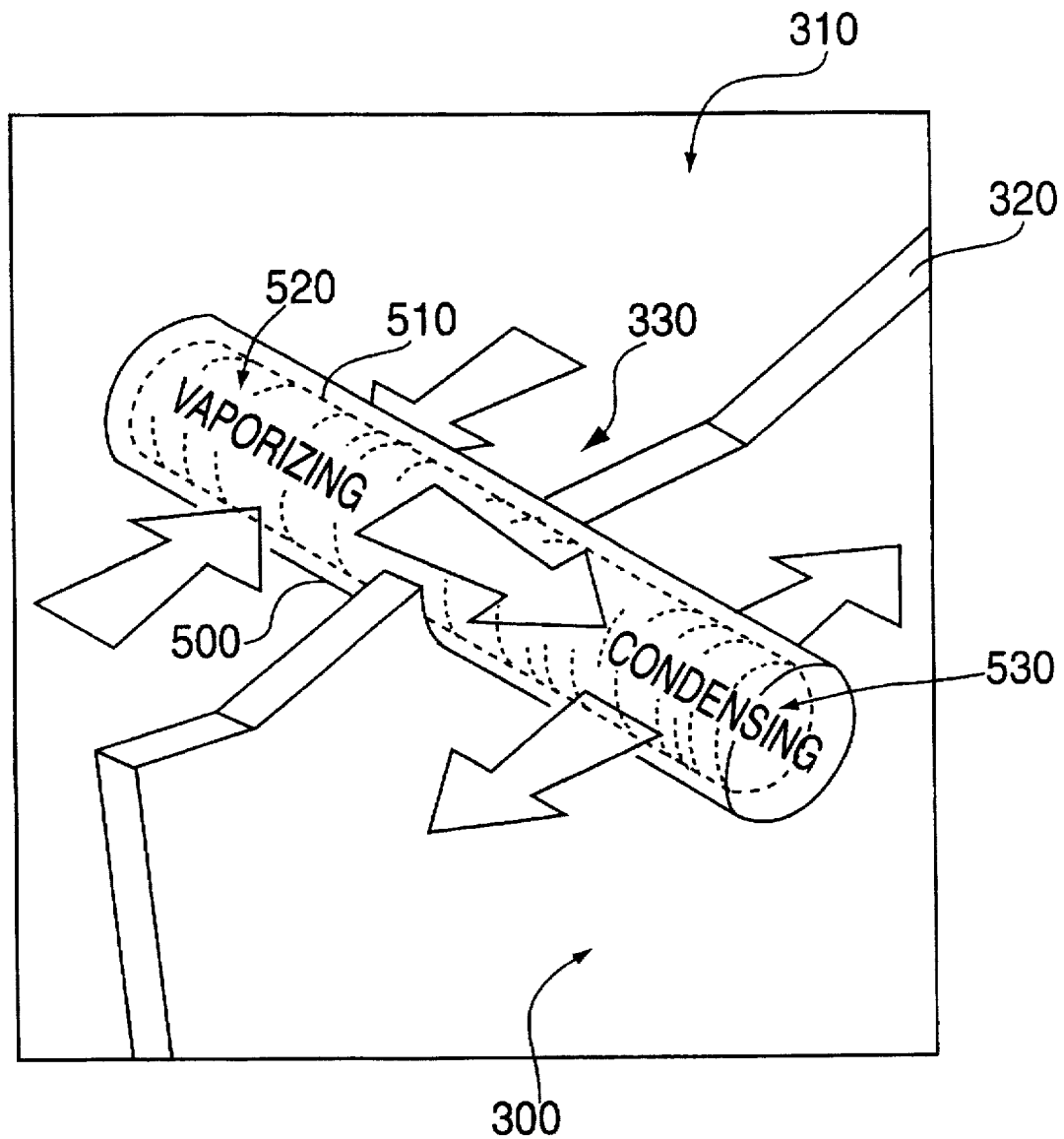
FIG. 5 illustrates a perspective view of the heat pipe of the present invention.

FIG. 5 illustrates a perspective view of the heat pipe 330 of the present invention. The heat pipes 330 are incorporated into each of the heat recovery module for recovering heat from waste gases or liquids. In the preferred embodiment of the present invention, the heat pipe 330 is a sealed hollow copper pipe 500 having a evaporation section 520 and a condensation section 530. The heat pipe includes a hollow, cylindrical wick 510 having an outer surface which rests against the inside diameter of the copper pipe 500 and an inner surface which circumscribes a vapor space extending longitudinally through the interior of the copper pipe. Furthermore, the heat pipe is evacuated and filled with a small quantity of an evaporable working fluid, such as water or alcohol. The working fluid is inserted into the heat pipe via a barrel with a threaded section (not shown) located on the condensation section of the heat pipe. In use, the evaporation section 520 of the heat pipe is exposed to a heat source from which heat is recovered and, contemporaneously, the opposite condensation section 530 of the pipe is cooled within a water manifold 300. The heat is transferred efficiently between a stream of hot gases/fluids and a stream of water within the water manifold.

The substantially cylindrical wick 510 is principally a tube of fine wire mesh constructed from a suitable metal such as bronze. Since the vapor pressure in the evaporation section 520 is greater than the condensation section 530, the evaporated working fluid moves from the evaporation section 520 toward the condensation section 530. The evaporated fluid is condensed in the cooler condensation section and is drawn back into the wick via capillary action along the wick surface that circumscribes the vapor space. The internal operation of the heat pipe allows it to be used successfully in a substantially horizontal position as shown in FIG. 4 and FIG. 5. In this manner, heat is recovered from waste gases and liquids through the repeated process of evaporating and condensing the working fluid.

Additionally, the sealed end of the evaporation section is manufactured by a high temperature silver soldering process to withstand high grade heat in the range of approximately 1,000° C. In contrast, the barrel on the sealed end of the condensation section is only soldered with a conventional plumber grade solder. In the event that the heat pipe is exposed to excessive heat, the "soft" solder will decay to allow the release of pressure from the heat pipe into the water manifold. This construction of the heat pipe prevents the continual build-up of vapor pressure within the heat pipe which may cause the heat pipe to explode. Additionally, the release of the vapor pressure into the water manifold permits the heat pipe to fail in a control manner, thereby minimizing the explosive effect. Although the heat pipe of the present invention is described using the reference numerals of the flue heat recovery module 130, the heat pipes are incorporated in each of the heat recovery module.

Figure 6:
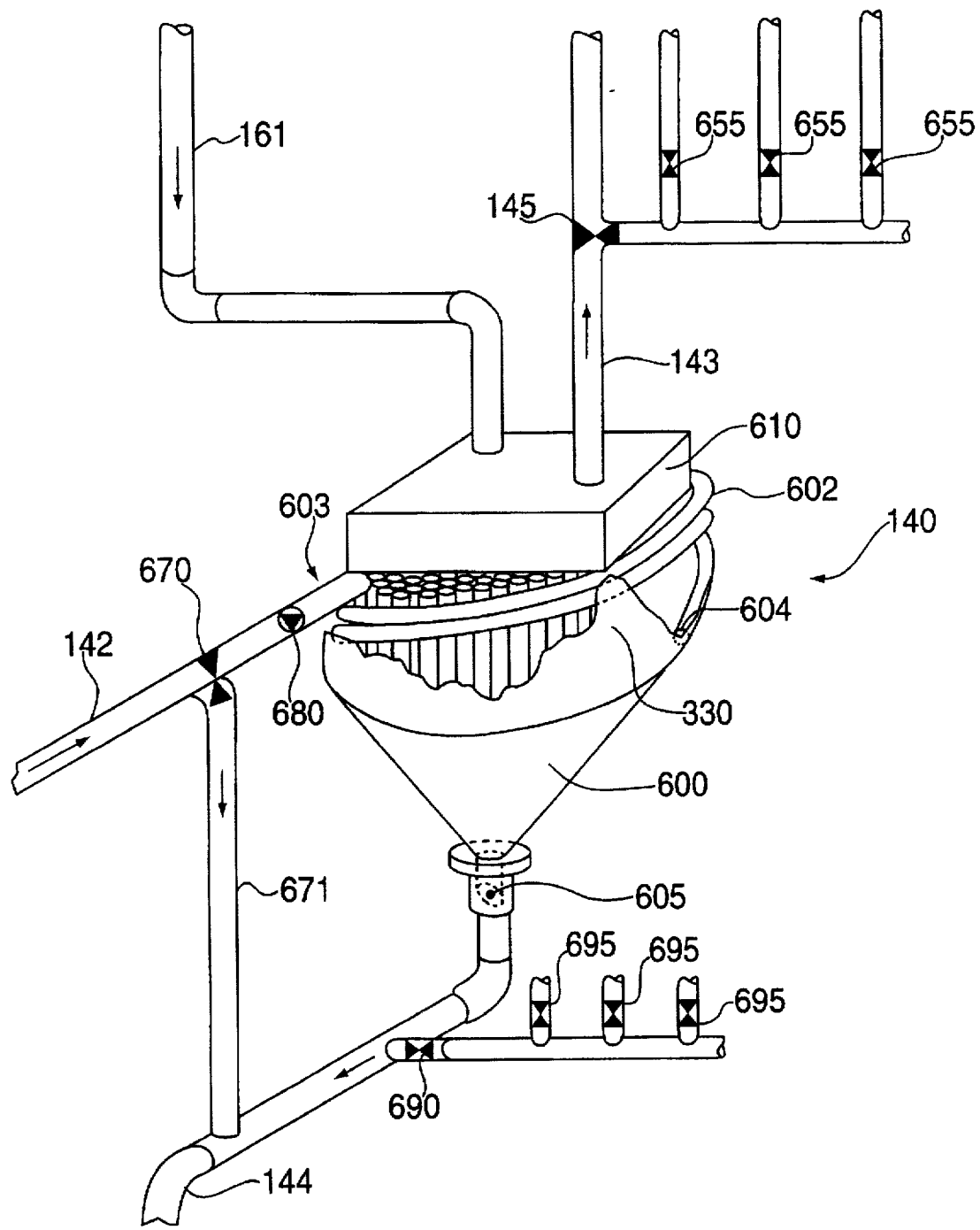
FIG. 6 illustrates a perspective view of the waste water heat recovery module of the present invention.
Figure 7:
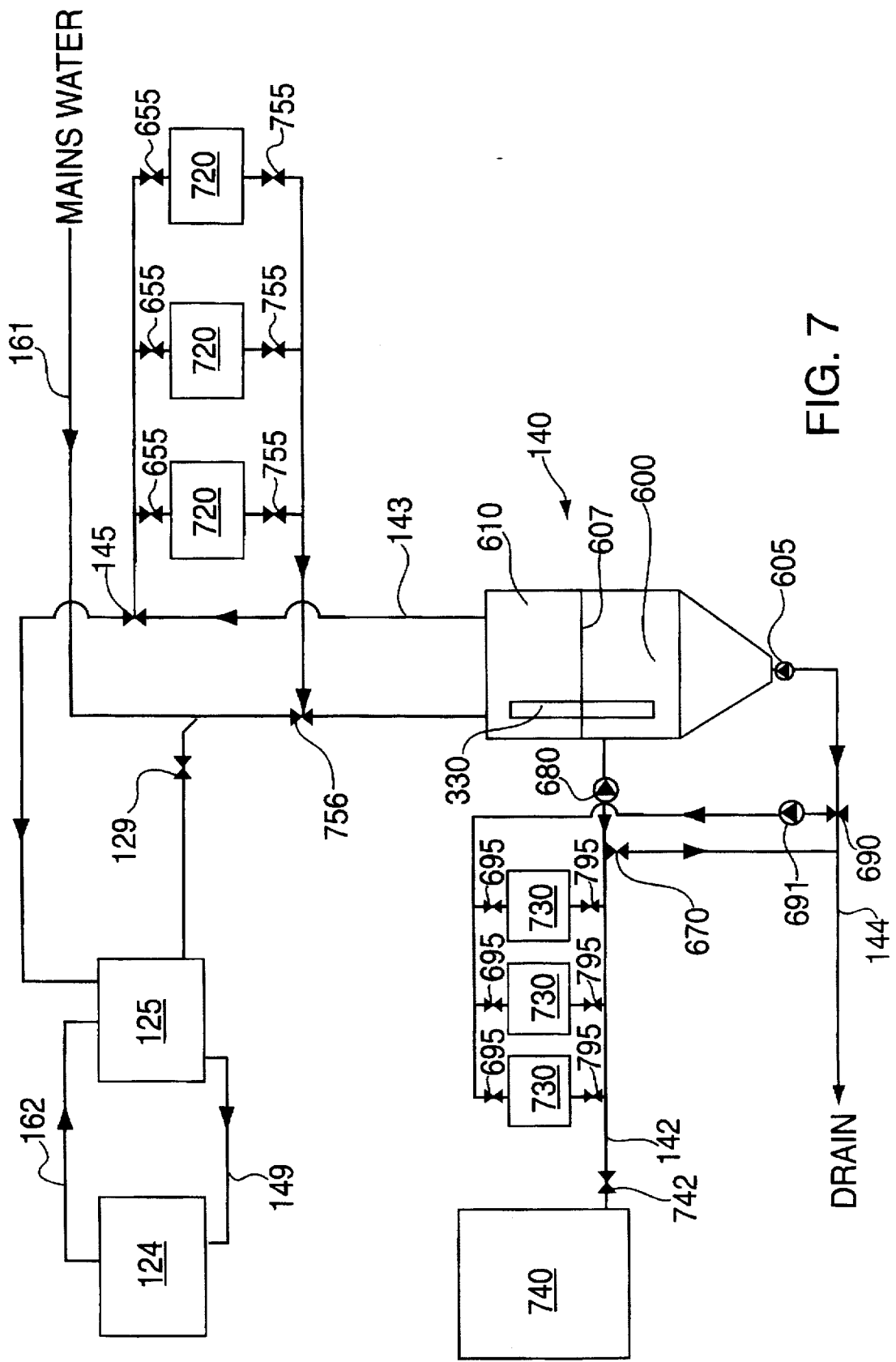
FIG. 7 illustrates a schematic flow diagram of the fluids within the waste water heat recovery module.

FIG. 6 and FIG. 7 depict the waste water heat recovery module 140 of the present invention for recovering heat from the waste fluids of a building. The waste water heat recovery module 140 is disposed between a drain pipe 142 and a sewage pipe 144 of a building where waste water is discharged to a sewage system. The waste water heat recovery module 140 comprises a plurality of heat pipes 330, a water manifold 610 and a substantially cone shaped waste water manifold 600.

The water manifold 610 is separated from the cone-shaped waste water manifold 600 by a metal plate 607 to form a water-tight seal. The heat pipes 300 extend through the metal plate with one end (condensation section) disposed within the water manifold and the other end (evaporation section) disposed within the waste water manifold. In use, hot waste water are passed around the evaporation section of the heat pipe in the waste water manifold 600 from which heat is extracted and transferred to the water manifold 610.

Waste water from a building is generally channeled to a common drain pipe 142 for disposal into a sewage pipe 144. In the present invention, a control valve 670 is used to control the flow of waste water into the waste water heat recovery module 140. If the controller 110 detects recoverable heat within the waste water, the control valve 670 operates to channel the waste water into the water manifold 610 via a coiled pipe 602 and water pump 680. Otherwise, cold waste water is simply discharged into the sewage pipe 144 via flow pipe 671.

The coiled pipe 602 possesses an ever decreasing diameter as it spirals downwardly within the waste water manifold. For example, the diameter of the coiled pipe at point 603 may measure at 4 inches while the diameter of the coil pipe at the point of exit 604 may measure at 2 inches. This coiled and decreasing diameter configuration produces acceleration and centrifugal action. As waste fluid accelerates through the coiled pipe 602, suspended solids are driven to the outer section of the coiled pipe 602. By positioning the exit point 604 in close proximity to the inner surface of the waste water manifold 600, the centrifugal force serves to discourage the suspended solid from entering the center of the waste water manifold 600.

To illustrate, as the suspended solids exit the coiled pipe 602, the combined effect of gravity and the centrifugal force causes the suspended solids to follow a substantially helical path along the inner surface of the waste water manifold. Since the heat pipes 330 are disposed substantially in the center of the waste water manifold, this configuration causes the solids to settle to the bottom of the waste water manifold 600 without fouling the heat pipes.

As the waste water manifold 600 is filled with waste fluids, the water manifold 610 is filled with cold water from water main 161. Once both manifolds are filled with fluids, the fluids are kept static for a predefined amount of time. This provides an opportunity for the suspended solids to settle and for the heat transfer process to extract the heat from the waste fluid. When an adequate amount of heat is recovered, the waste water is discharged through release valve 605, while heated water is channeled from the water manifold to the supplement tank 125 via flow pipe 143.

Referring to FIG. 6 and FIG. 7, in a second embodiment of the waste water heat recovery module 140, a plurality of fluid storage sections are provided as temporary storage for improving the heat transfer process. Since it may not be possible to extract all the recoverable heat from the waste water in one pass, the additional fluid storage sections permit the waste water to be rechanneled into the waste water recovery module 140 repeatedly. Once a substantial amount of the reusable heat is recaptured, the waste water is finally discharged into the sewage system.

An effluent holding tank 740 is provided for receiving a supply of waste fluid, which is controllably discharged through release valve 742 to drain pipe 142. The flow of the waste fluid to the waste water heat recover module is as described above. However, if the controller 110 determines that the waste water still contains recoverable heat after passing through the waste water heat recovery module 140, the waste water is selectively directed from the drain by the release valve 690 to a plurality of fluid storage sections 730 via a pump 691 and a plurality of release valves 695. This configuration allows the controller 110 to reintroduce the waste water through a plurality of release valves 795 to the waste water heat recovery module 140 at a later time.

A similar configuration is provided to the heat recovery side of the waste water heat recovery module. If the controller 110 determines that the supplemental tank 125 is not in condition to receive additional heated water, or the water has not sufficiently absorbed enough heat, the heated water is selectively directed from the flow pipe 143 by control sensor 145 to a plurality of fluid storage sections 720 via a plurality of release valves 655. Again, the controller 110 is able to selectively reintroduce the heated water through a plurality of release valves 755 and 756 to the waste water heat recovery module 140 at a later time.

Figure 8:
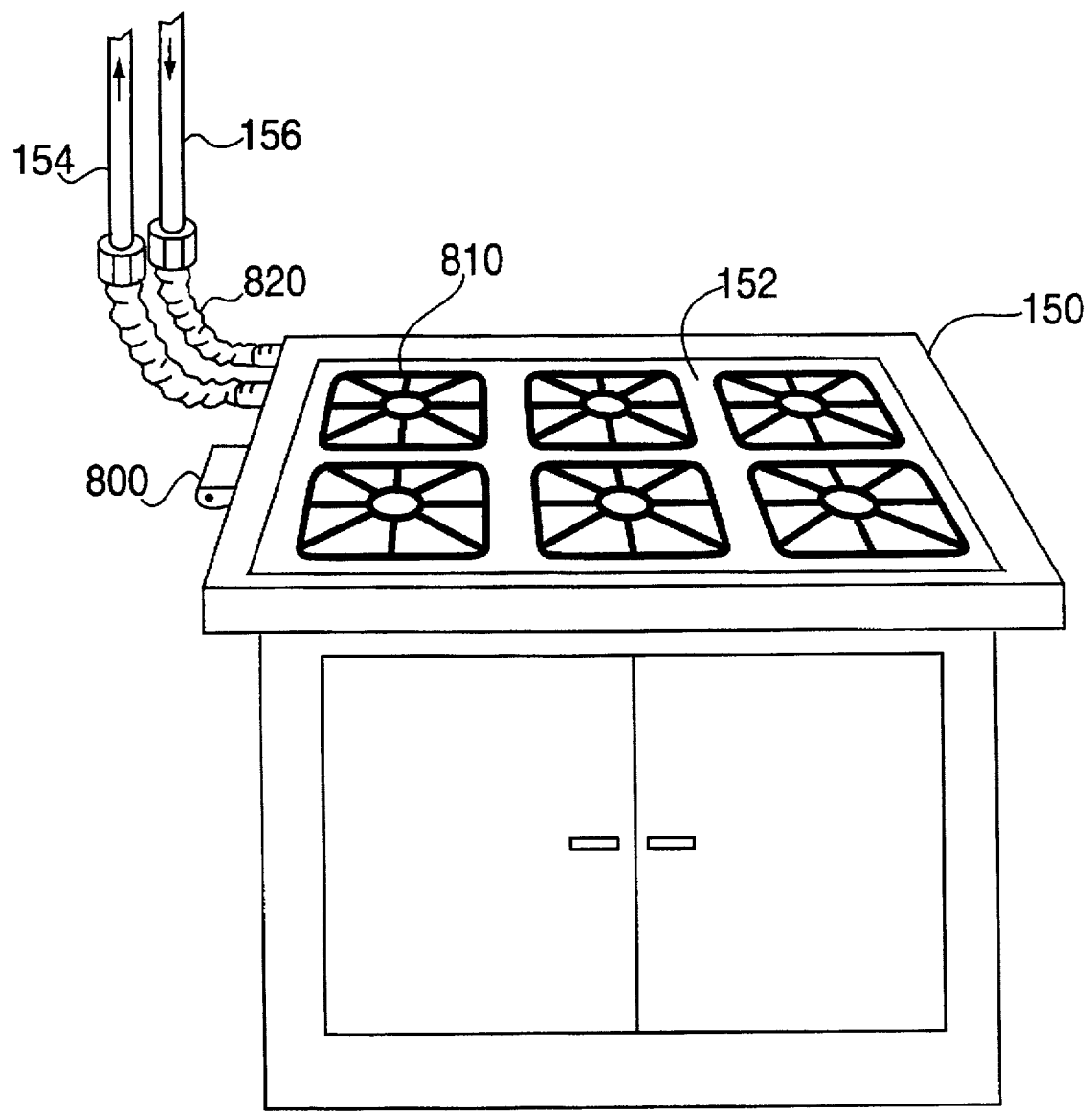
FIG. 8 illustrates a perspective view of the cooker heat recovery module adapted to a cooking range.

Generally, a large quantity of high grade heat escapes from the periphery of cooking utensils (pans and kettles) during the cooking process. Such high grade heat is wasted through natural emission to the environment or forced evacuation through a ventilation system. FIG. 8 depicts a perspective view of the cooker heat recovery module 150 of the present invention adapted to a cooking range 152 for recovering heat from hot gases at the flame source. The cooker heat recovery module 150 fits directly over the top of the cooking range without blocking access to the plurality of burners 810. The cooker heat recovery module is pivotally coupled to the cooking range through a hinge 800. A set of flexible pipes 820 is provided for coupling the cooker heat recovery module to a set of water pipes 154 and 156. This configuration permits the cooker heat recovery module 150 to be easily elevated for cleaning purposes.

Figure 9:
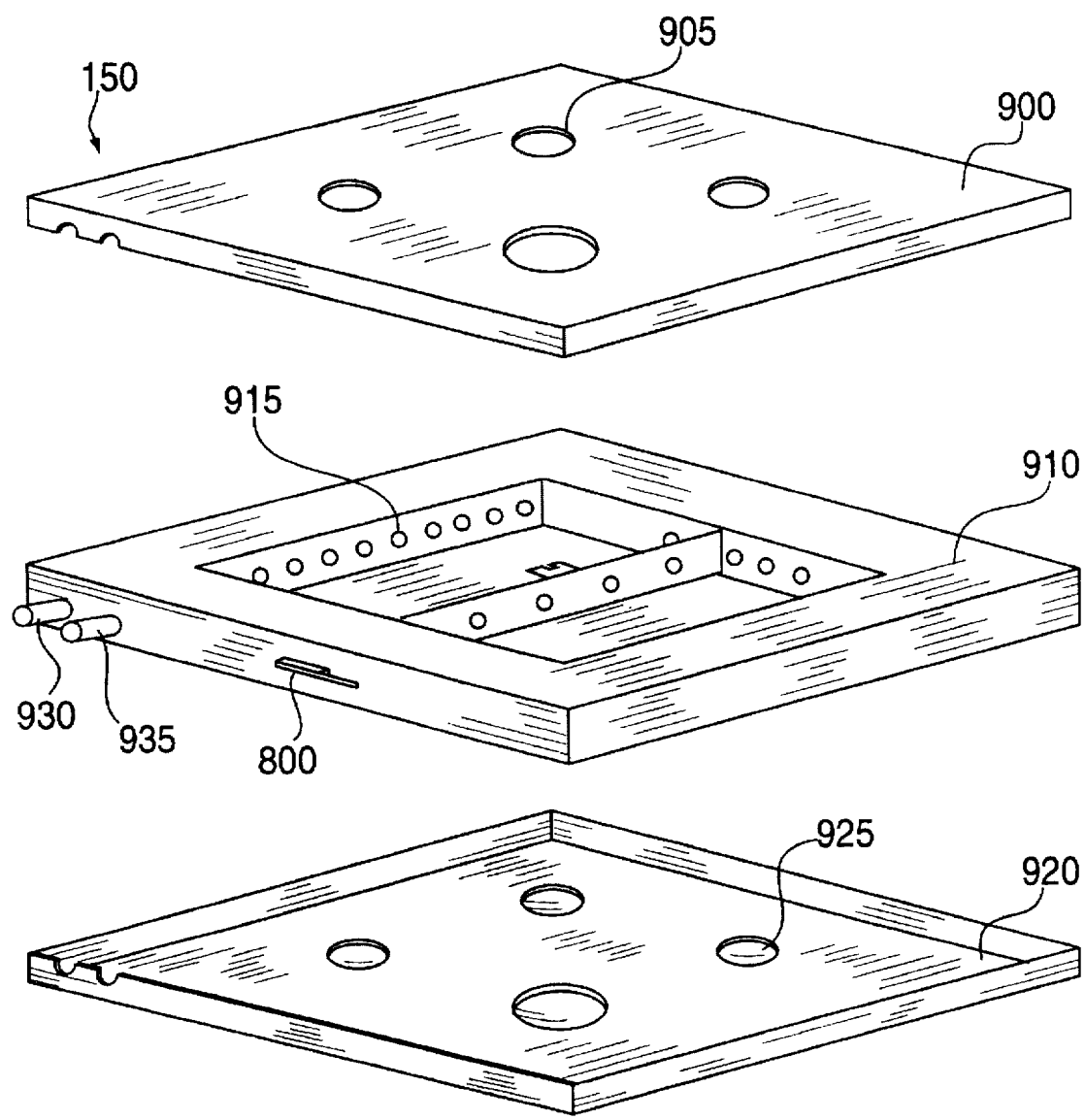
FIG. 9 illustrates an exploded perspective view of the cooker heat recovery module of the present invention.

FIG. 9 depicts an exploded perspective view of the cooker heat recovery module for a cooking range having four burners. However, those skilled in the art will realize that the cooker heat recovery module can be modified to accommodate any number of burners. The cooker heat recovery module 150 comprises a plurality of heat pipes 330 (shown in FIG. 10), a center water manifold 910, a top plate 900 having a plurality of apertures 905 and a bottom plate 920 having a plurality of apertures 925. The two plates are coupled to the center water manifold to define a substantially enclosed burner space which circumscribes the burners of the cooking range 152.

The center water manifold 910 is substantially hollow and is fabricated from a corrosion resistant metal such as steel. The center water manifold 910 comprises a plurality of apertures 915 for the insertion of heat pipes to form a liquid-tight seal.

Figure 10:
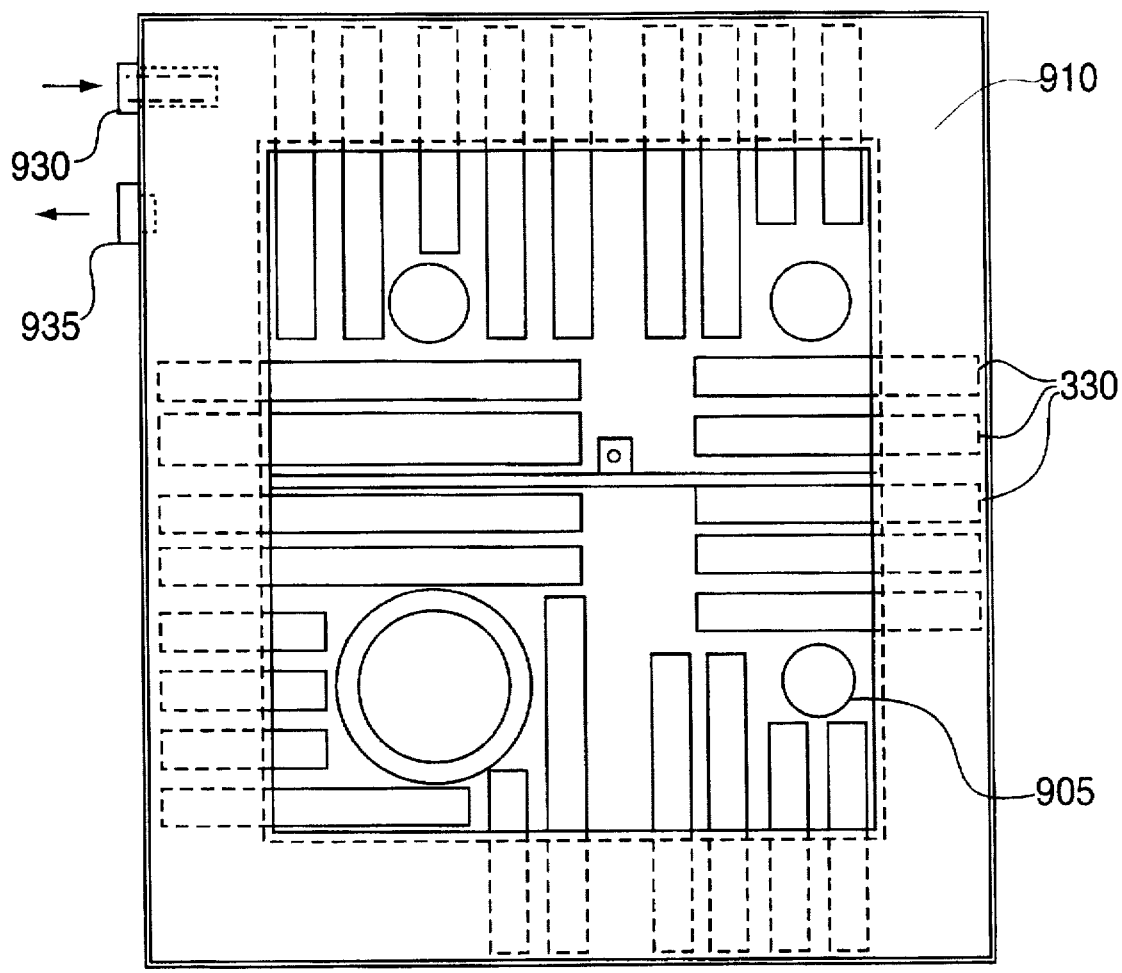
FIG. 10 illustrates a top view of the cooker heat recovery module.

Referring to FIG. 10, the heat pipes 330 extend horizontally through the center water manifold 910 with one end (condensation section) disposed within the center water manifold and the other end (evaporation section) disposed within the burner space defined by the top and bottom plates 900 and 920. The heat pipes vary in length and orientation which are dictated by the specific configuration of a particular cooking range. In use, hot gases are passed around the evaporation section of the heat pipe 330 within the burner space from which heat is extracted and transferred to the center water manifold 910.

The center water manifold 910 further comprises an inlet stem 930 and an outlet stem 935 from which water is received and extracted from the center water manifold respectively. The inlet stem is coupled to the flow pipe 154, while the outlet stem is coupled to the return pipe 156 via the set of flexible pipes 820. As water circulates within the center water manifold 910, the lateral and oblique flow of heat from the flame source is absorbed by the circulating water. The heated water is channeled from the center water manifold to the distribution manifold 120 for distribution to a demand circuit.

Figure 11:
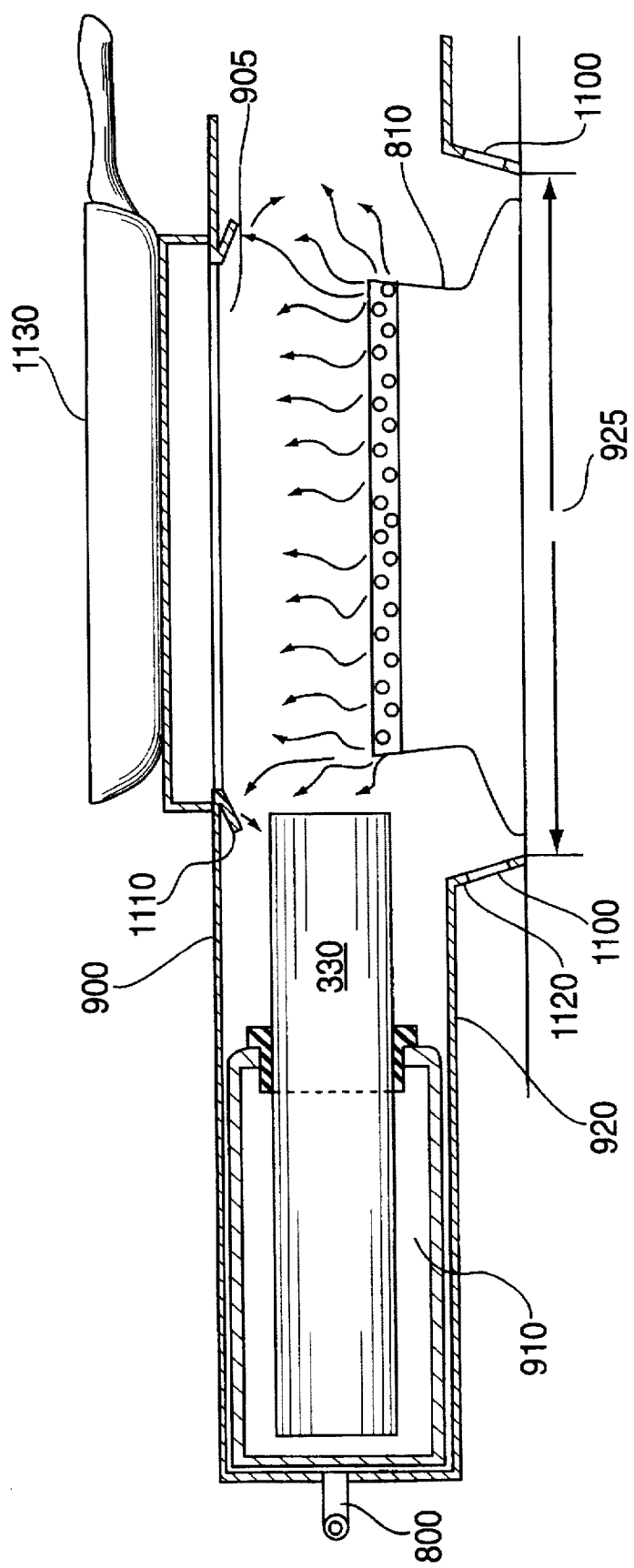
FIG. 11 illustrates a sectional view of the cooker heat recovery module.

FIG. 11 illustrates a sectional side view of the cooker heat recovery module 150 enclosed around a burner 810. The bottom plate 920 contains a plurality of apertures 925 for receiving a plurality of burners 810. Each aperture 925 includes a lip or ring 1120 extending downwardly at an angle from the edge of the aperture. The size of the apertures 925 disposed on the bottom plate 920 must be sufficient to fit over a conventional burner with a gas ring or an electric heating coil. A plurality of equally spaced apertures 1100 are disposed on each lip 1120 for receiving air used in the combustion process. The size of the apertures 1100 is suitably about 10 millimeters in diameter.

Similarly, the top plate 900 also contains a plurality of apertures 905 for receiving a plurality of burners 810. The aperture 905 is aligned directly above the aperture 925, for channeling the heat generated by the burner 810 to a cooking utensil 1130. Each aperture 905 also includes a lip or ring 1110 extending downwardly at an angle from the edge of the aperture 905. The lip 1110 serves to reflect heat from the burner 810 back into the burner space where the reflected heat is recovered by the plurality of heat pipes 330. Typically, the oblique flow of heat at the edge of the burner is simply discharged into the environment without contributing to the cooking process. Thus, the recovery of this waste heat will not cause a detrimental loss in the heat consumed by the cooking process.

Figure 12:
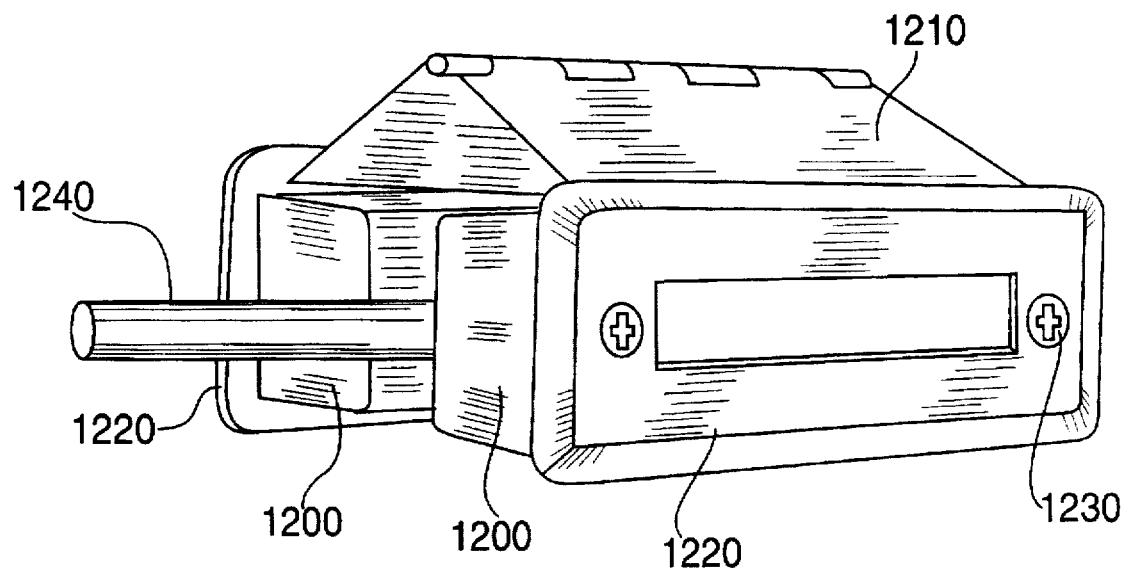
FIG. 12 illustrates a perspective view of the magnetic ionization module of the present invention.

FIG. 12 illustrates a perspective view of the magnetic ionization module of the present invention. The plurality of magnetic ionization modules includes a fuel magnetic ionization module 160 and a water magnetic ionization module 170. The two magnetic ionization modules are identical in construction, but they are applied to different parts of a building to achieve different results. The fuel magnetic ionization module 160 serves to charge hydrocarbon fuels to effect a cleaner combustion process. On the other hand, the water magnetic ionization module 170 operates to charge mineral molecules in the water to prevent crystallization.

Water and most organic compounds are diamagnetic, as are many nonmetals. A diamagnetic substance possesses a negative magnetic susceptibility which is displayed by a repulsion of the compound from an applied magnetic field. This negative magnetic susceptibility is a consequence of an induced magnetization generated by lines of magnetic flux penetrating the electron loops around the atoms. Diamagnetic materials are made up of molecules that have no permanent magnetic dipole moment. When an external magnetic field is applied, magnetic dipoles are induced, but the induced magnetic dipole moment is in the direction opposite to that of the field. Namely, the direction of this induced magnetization is opposite to that of the external magnetic field. In effect, the external magnetic field increases the orbital speed of electrons revolving in one direction, and to decrease the speed of electrons revolving in the other direction. The net result is a net dipole moment opposing the external magnetic field. The external magnetic field reduces the stability of the electrons and increases the ion's affinity for other stable electrons. Thus, the resulting diamagnetic ions exhibit a net positive charge or "positive ionization".

The fuel magnetic ionization module 160 serves to charge the hydrocarbon fuel within the fuel inlet pipe. The process of positive ionization encourages fuel molecules to bond with negatively charged oxygen, thereby resulting in a more complete and efficient combustion.

Similarly, the magnetic field within the water magnetic ionization module 170 serves to charge the mineral molecules in water to prevent crystallization. The positively charged mineral molecules have a tendency to dissolve into the charged water molecules.

Each magnetic ionization module comprises a plurality of ceramic magnets 1200, a hinge 1210, magnet housings 1220 and a plurality of securing devices such as screws 1230. In the preferred embodiment of the present invention, the ceramic magnet blocks 1200 are used to generate a magnetic field strength of approximately 2,000 gauss through the center of a pipe having a diameter between 12 to 15 millimeters. The dimension of the magnet is approximately 60 millimeters in length, 20 millimeters in height and 15 millimeters in width. Such ceramic magnets are available from Bakker Madava of Holland.

Each ceramic magnet is coupled to a magnet housing 1220 by a plurality of screws 1230. The magnet housing is constructed from a suitable material such as plastic and is coupled to a zinc plated hinge 1210 for joining a pair of magnets 1200. The magnets are oriented such that the north pole of one magnet is facing the south pole of another magnet, thereby causing attraction between the two magnets 1200. This hinging configuration permits a single magnetic ionization module to easily fit over a wide range of pipe sizes (up to 50 millimeters). In use, the magnetic ionization module circumscribes a pipe 1240 from which a strong magnetic field is applied to the material flowing within the pipe.

Figure 13:
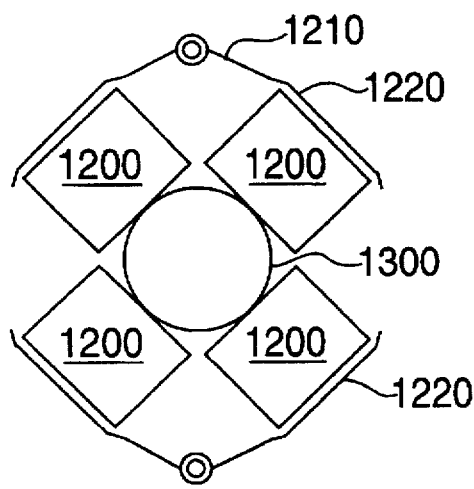
FIG. 13 illustrates a configuration of the magnetic ionization modules around a pipe.
Figure 14:
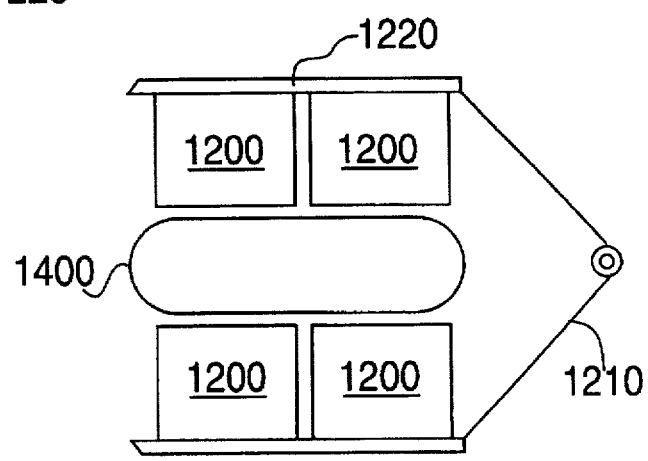
FIG. 14 illustrates a second configuration of the magnetic ionization modules around a pipe.

FIG. 13 and FIG. 14 depict two configurations of the magnetic ionization modules adapted to pipes of different sizes and shapes. If a pipe 1300 is particularly large, a plurality of magnetic ionization modules are employed to provide adequate magnetic field strength as shown in FIG. 13. Alternatively, the magnet housings 1220 can be modified to accommodate additional magnets 1200 as shown in FIG. 14 adapted to an elongated pipe 1400.

Figure 15:
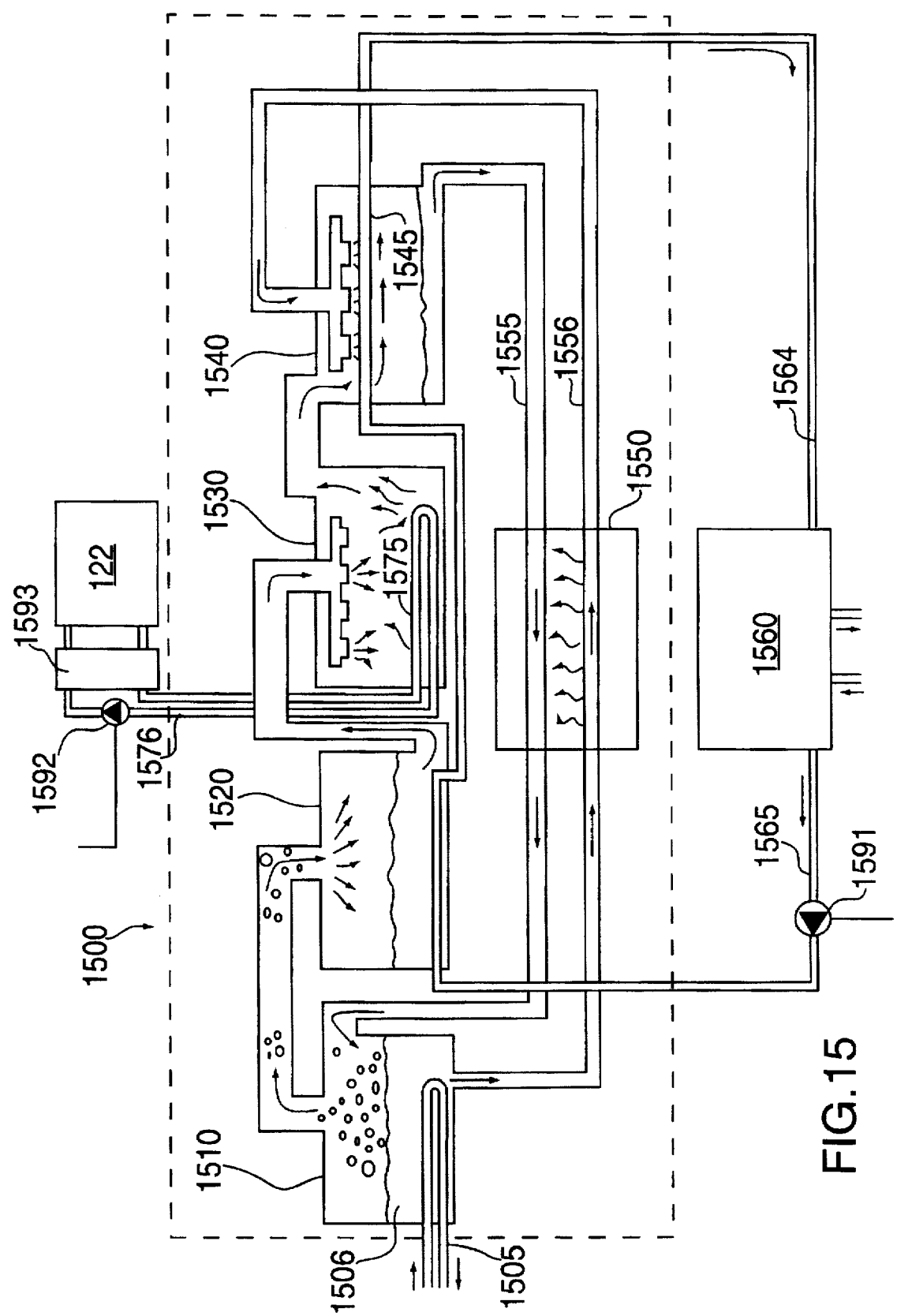
FIG. 15 illustrates a schematic flow diagram of the process within a "packaged absorption chiller" for providing cooled water to a central air conditioning system.

In a second embodiment of the present invention, recovered heated water from a heat recovery module such as the cooker heat recovery module 150, is utilized to generate cooled water for an air conditioning system. FIG. 15 schematically depicts an "packaged absorption chiller" 1500 driven by the recovered heated water of a heat recovery module for the generation of cooled water. Packaged absorption chillers are commercially available. The packaged absorption chiller 1500 comprises a concentrator section 1510, a condenser section 1520, an evaporator section 1530, an absorber section 1540 and a heat exchanger 1550. The packaged absorption chiller 1500 operates on a working solution of lithium bromide and a refrigerant such as water.

Concentrator section 1510 receives heated water or steam from a heat recovery module through a flow pipe 1505 to boil a dilute solution of lithium bromide 1506. The boiling releases the refrigerant from the solution and concentrates the remaining lithium bromide solution. The refrigerant is released from the concentrator section 1510 and is channeled into a condenser section 1520.

Cooling water from a heat recovery module 1560 is used to condense and cool the refrigerant in the condenser section 1520 via a flow pipe 1565 and pump 1591. In turn, the refrigerant is sprayed over a tube bundle 1575 carrying central air conditioning water in the evaporator section 1530. The refrigerant absorbs the heat from the central air conditioning water causing the refrigerant to vaporize. The cooled central air conditioning water is channeled from the evaporator section 1530 through a pump 1592 and an optional buffer tank 1593 to the central heating/cooling system 122.

The refrigerant is subsequently drawn into the absorber section 1540, where the refrigerant is recombined with the concentrated solution of lithium bromide from the concentrator section 1510. In order to enhance the recombination process, the concentrated lithium bromide solution is sprayed over a tube bundle 1545, where cooled water absorbs the heat generated from the recombination process. Furthermore, the flow of lithium bromide solution between the concentration section 1510 and the absorption section 1540 passes through a heat exchanger 1550. The heat exchanger 1550 transfers heat from the relatively cool, dilute solution of the absorber section 1540 to the hot concentrated solution of the concentrator section 1510. This transfer of heat reduces the heat needed to boil the lithium bromide solution in the concentrator section and reduces the amount of heat that is removed from the absorber section.

Furthermore, the water used to cool the refrigerant in condenser section 1520 and absorber section 1540 is returned to the heat recovery module 1560, where heat is extracted to produce heated water. Alternatively, heat recovery module 1560 may simply comprise a water source from a water tower or water main and a return pipe directing the heated water to a holding tank for later use.

Finally, the water pumps 1591 and 1592 are under the control of the controller 110. When the controller detects a demand for heated water to drive the packaged absorption chiller 1500, it channels heated water from an appropriate heat recovery module and activates the water pumps 1591 and 1592. Thus, the controller 110 serves to manage the cooling and heating needs of a building.

There has thus been shown and described a novel system and method that incorporates a controller, a distribution manifold, and a plurality of heat recovery modules and magnetic ionization modules for recovering heat from waste fluids and gases and for improving the combustion of hydrocarbon fuels. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

What is claimed is:

1. A system for a building having a plurality of heated water demand circuits and heated water supply circuits, said system comprising;

a distribution manifold, coupled between the plurality of heated water demand circuits and heated water supply circuits, for exchanging a working fluid between the demand circuits and the supply circuits; and a heat recovery module, coupled to one of the plurality of supply circuits, for heating said working fluid from waste heat of the building; and a controller, electrically coupled to said heat recovery module, for determining a heated water demand of the building and for controlling said heat recovery module to satisfy said heated water demand.

2. The system of claim 1, further comprising a heat generating means, coupled to said controller and to one of said plurality of supply circuits, for heating said working fluid, wherein said controller selects between said heat generating means and said heat recovery module to satisfy said heated water demand.

3. The system of claim 2, wherein said heat generating means is a boiler.

4. The system of claim 2, wherein said heat recovery module is a flue heat recovery module for recovering heat from hot gases within a flue of said heat generating means.

5. The system of claim 4, further comprising a waste water heat recovery module, coupled to one of said plurality of supply circuits, for recovering heat from waste water of the building.

6. The system of claim 5, further comprising a cooker heat recovery module, coupled to one of said plurality of supply circuits, for recovering heat from hot gases around a burner of a cooking range.

7. The system of claim 2, wherein said heat recovery module is a waste water heat recovery module for recovering heat from waste water of the building.

8. The system of claim 2 wherein said heat recovery module is a cooker heat recovery module for recovering heat from hot gases around a burner of a cooking range.

9. The system of claim 2 further comprising a hot water tank, coupled to one of said plurality of heated water demand circuits, for holding hot water.

10. The system of claim 9 further comprising a supplemental tank, coupled to said hot water tank, for supplying and receiving water to and from said hot water tank.

11. The system of claim 10 further comprising a second heat recovery module, coupled to said supplemental tank, for providing heated water from waste heat of the building.

12. The system of claim 2 further comprising a heating system, coupled to one of said plurality of heated water demand circuits, for heating a space.

13. The system of claim 2, wherein said distribution manifold comprises:

a first chamber, coupled to said plurality of heated water demand circuits;

a second chamber, coupled to said plurality of heated water supply circuits;

a first pipe, coupled between said first chamber and said second chamber; and a second pipe, coupled between said first chamber and said second chamber, where a flow of heated working fluid destined for the plurality of demand circuits, is directed from said second chamber to said first chamber through said first pipe, where contemporaneously, a flow of cooled working fluid destined for the plurality of supply circuits, is directed from said first chamber to said second chamber through said second pipe.

14. The system of claim 13, further comprising:

a first temperature sensor, coupled to said first pipe, for measuring the temperature of the working fluid within said first pipe;

a second temperature sensor, coupled to said second pipe, for measuring the temperature of the working fluid within said second pipe; and a flow sensor, coupled to said second pipe, for measuring the flow rate of the working fluid within said distribution manifold, wherein said controller, electrically coupled to said temperature and flow sensors, determines said heated water demand.

15. The system of claim 2, further comprising a magnetic module, coupled to said heat generating means, for charging a flow of hydrocarbon fuel used by said heat generating means.

16. The system of claim 2, further comprising a magnetic module, coupled to said heat generating means, for charging said working fluid to prevent crystallization of minerals within said working fluid.

17. The system of claim 2, further comprising a communication apparatus, coupled to said controller, for managing an energy need of the building from a remote location.

18. The system of claim 1, wherein said heat recovery module is, further coupled to an absorption chiller, for providing cooled water to an air conditioning system by providing heated water to operate said absorption chiller.

19. A method for recovering thermal energy from a building having a plurality of heated water demand circuits and heated water supply circuits, comprising the steps of:

heating a working fluid with a source of waste heat;

determining a heated water demand of the building;

determining a heated water supply of the building;

exchanging said working fluid between the demand circuits and the supply circuits through a distribution manifold; and controlling said exchanging of working fluid by matching said heated water demand with said heated water supply.

20. The method of claim 19, further comprising the step of heating said working fluid with a combustion process and wherein said controlling step includes matching said heated water demand with one of said heating steps.

21. A heat recovery apparatus for recovering heat from the hot gases within a flue, said apparatus comprising:

a gas manifold, coupled to the flue, for receiving the hot gases;

a liquid manifold, coupled to said gas manifold, for receiving a working fluid;

a plurality of heat pipes having an evaporation section and a condensation section, where said heat pipes extend through a metal plate separating said gas manifold from said liquid manifold, where said evaporation sections of said heat pipes are disposed within said gas manifold and said condensation sections of said heat pipes are disposed within said liquid manifold, where heat is extracted from the hot gases within the flue to heat said working fluid; and a fluid storage section extending from said liquid manifold, for storing said heated working fluid.

22. The heat recovery apparatus of 21, further comprising a release valve, coupled to said fluid storage section, for releasing excessive pressure automatically within said fluid storage section, and wherein said fluid storage section extends vertically from said liquid manifold.

23. A heat recovery apparatus for recovering heat from the hot gases around the burners of a cooking range, said apparatus comprising:

a first plate having a plurality of apertures;

a liquid manifold, coupled to said first plate, for receiving a working fluid;

a second plate having a plurality of apertures,. coupled to said water manifold, where said plates and said liquid manifold defines a substantially enclosed space around the burners of the cooking range; and a plurality of heat pipes having an evaporation section and a condensation section, where said heat pipes extend through said liquid manifold, where said evaporation sections of said heat pipes are disposed within said substantially enclosed space and said condensation sections of said heat pipes are disposed within said liquid manifold, where heat is extracted from the hot gases around the burners to heat said working fluid.

24. The heat recovery apparatus of 23, wherein each of said apertures of said first plate includes an angled extension for deflecting heat toward the substantially enclosed space.

25. A heat recovery apparatus for recovering heat from waste fluids, said apparatus comprising:

a first liquid manifold having a substantial cone shape, coupled to a sewage pipe, for receiving the waste fluids;

a second liquid manifold, coupled to said first liquid manifold, for receiving a working fluid; and a plurality of heat pipes having an evaporation section and a condensation section. where said heat pipes extend through a metal plate separating said first liquid manifold from said second liquid manifold, where said evaporation sections of said heat pipes are disposed within said first liquid manifold and said condensation sections of said heat pipes are disposed within said second liquid manifold, where heat is extracted from the waste fluids to heat said working fluid.

26. The heat recovery apparatus of 25, further comprising a coiled pipe having an ever decreasing diameter, coupled between said sewage pipe and said first liquid manifold, for applying an acceleration and a centrifugal force to the waste fluid to prevent fouling of said heat pipes.

27. The heat recovery apparatus of 26, further comprising a plurality of storage sections for holding the waste fluid and said working fluid, where the waste fluid and said working fluid are selectively recirculated into the heat recovery apparatus.

* * * * *